UNITED STATES PATENT OFFICE.

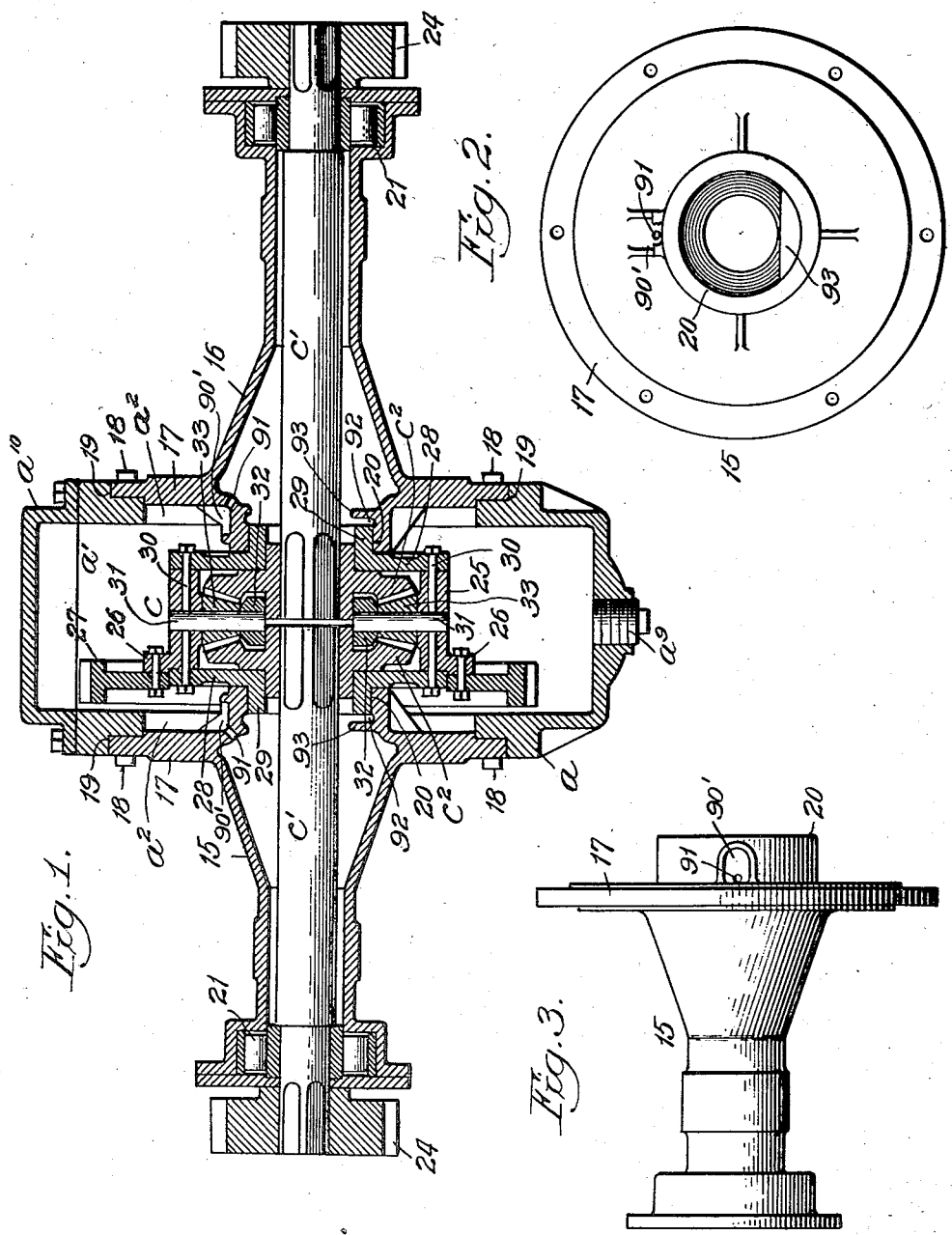

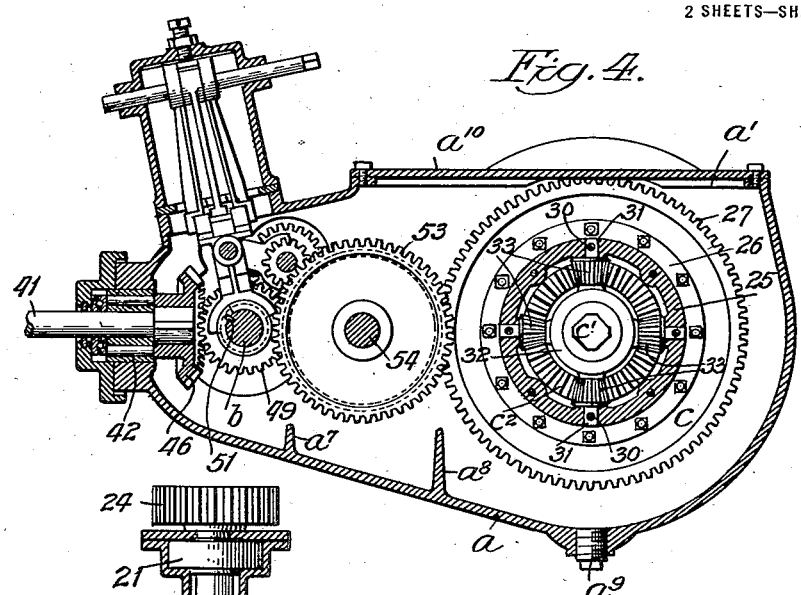
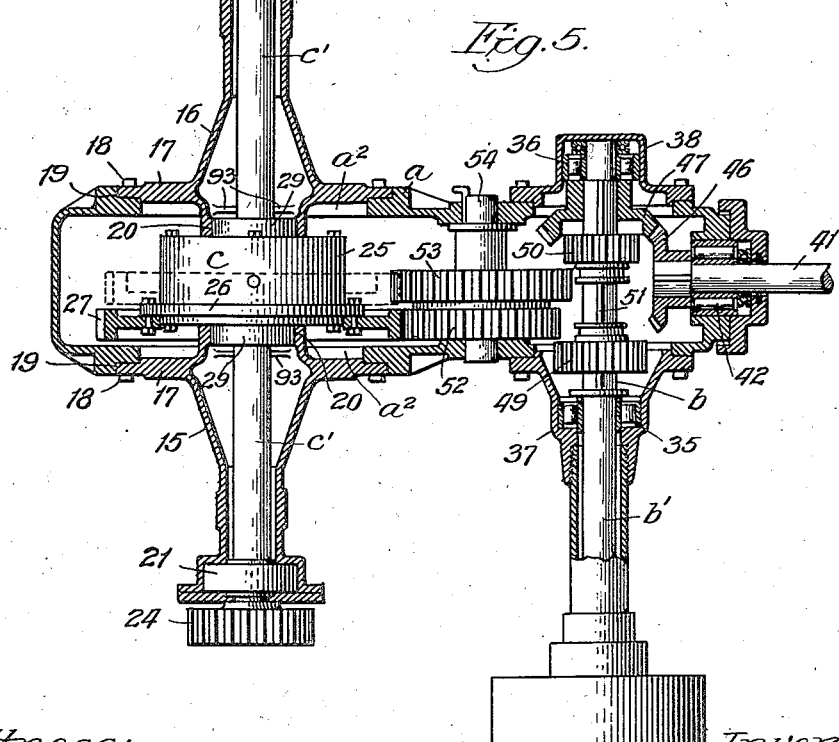

JOHN B. FOOTE, OF OAK PARK, ILLINOIS, AND GEORGE T. STRITE, OF MINNEAPOLIS, MINNESOTA, ASSIGNORS TO FOOTE BROS. GEAR & MACHINE CO., OF CHICAGO, ILLINOIS, A CORPORATION OF ILLINOIS.

GEARING FOR TRACTORS.

1,420,995.  Specification of Letters Patent.  Patented June 27, 1922.

Original application filed September 28, 1916, Serial No. 122,594. Divided and this application filed August 26, 1918. Serial No. 251,442.

*To all whom it may concern:*

Be it known that we, JOHN B. FOOTE and GEORGE T. STRITE, citizens of the United States, and residents of Oak Park, in the county of Cook and State of Illinois, and Minneapolis, in the county of Hennepin, State of Minnesota, respectively, have invented new and useful Improvements in Gearing for Tractors, of which the following is a full, clear, and exact description.

The invention relates to transmission gearing for tractors and more particularly to means for lubricating the bearings.

The present application contains matter which is a division of that set forth in an application filed by us September 28, 1916, Serial No. 122,594.

The object of the invention is to provide improved means for lubricating the bearings in the differential transmission gearing to keep the bearings properly lubricated.

A further object of the invention is to provide improved means for supplying lubrication of a series of gear wheels in the transmission gearing.

The invention consists in the several novel features hereinafter set forth and more particularly defined by claims at the conclusion hereof.

In the drawings: Fig. 1 is a vertical transverse section through the differential gearing embodying the invention. Fig. 2 is an inner end view of one of the sleeves for the differential shafts. Fig. 3 is a plan of the same. Fig. 4 is a vertical longitudinal section and Fig. 5 is a horizontal section, parts being shown in elevation.

The variable speed gearing and the differential gearing are enclosed within the case $a$ which is adapted to retain lubricant for the gearing. A drive shaft $b$ is mounted in and near one end of the case and the differential gearing $c$ is mounted in and near the other end of the case. The end of the case $a$, containing the differential gearing, is supported by sleeves 15 and 16, each provided with a flange or head 17 which is secured in a recess 19 at one side of the case by bolts 18. At its inner end, each of the sleeves is provided with a bearing 20 and at its outer end with a roller bearing 21, the outer ends of these sleeves are suitably secured to or on the supporting frame of the tractor in any suitable manner.

Driven shafts $c'$ are mounted in sleeves 15 and 16 respectively and the outer end of each of these shafts has a pinion 24 fixed thereto to drive a gear on one of the traction wheels. The differential gear $c$ for the driven shafts $c'$ comprises a drum 25 formed with an integral flange 26 for attachment of a gear ring 27 by which the differential gearing will be driven. Drum 25 comprises flanged sides 28, each of which has a hub 29 journalled in one of the bearings 20 on the sleeves 15, 16. The members of the drum 25 are secured together by bolts 30. Arbors 31 are mounted in drum 25 and a ring 32. Bevelled pinions 33 on arbors 31 mesh with the bevelled gears $c^2$ on shaft $c'$ respectively. The rear portion of the case $a$ is provided with an opening $a'$ through which the gear ring 27 and other parts may be placed into and removed from the case. This opening is normally closed by a cover $a^{10}$. Openings $a^2$ formed in the sides of the case $a$ are of sufficient diameter to permit the drum to be inserted laterally into the case.

Drive shaft $b$ is journalled in a bearing 35 carried in a head 37 which is removably secured to one side of the case and a bearing 36 which is carried by a head 38 which is removably secured to the other side of the case. This shaft extends laterally to one side of the gear-case, as at $b'$, and is provided with a service pulley for driving any mechanism other than the traction wheels of the tractor. A motor driven shaft 41 is mounted in a suitable bearing 42 in one end of the case $a$. Bevelled pinion 46 on shaft 41 meshes with a bevelled gear 47 which is fixed to the drive shaft $b$ to impart movement to the shaft $b$. A high speed pinion 49 and a low speed pinion 50 are slidably mounted and separately movable on the shaft $b$, being connected thereto by a key 51 in such manner as to cause both pinions to be driven in all positions on the shaft. Intermediate gears 52 and 53 mounted on a stud shaft 54 in case $a$ are adapted to drive the differential gearing from the pinions on the shaft $b$. High speed pinion 49 is movable laterally on the shaft $b$ into engagement with the gear 52 and low speed pinion 50 is movable into and out of engagement with gear 53. Gear 52 meshes constantly with the gear ring 27 which is fixed to the gear drum 25. Any suitable controlling mechanism may be used, and for a specific exemplification of such, reference may be had to our aforesaid application Serial No. 122,594.

The case $a$ is adapted to contain lubricant so that the lower portion of the gearing will run in oil, and cross-walls $a^7$ and $a^8$ are formed on the bottom of case $a$ to hold lubricant where the intermediate gears will dip into it and so that the lubricant will also be splashed on the gears on shaft $b$. A drain plug $a^9$ is provided in the bottom of the case $a$.

The lower portion of the gear ring 27 travels in the lubricant held in the lower portion or compartment of the case $a$ and this causes the lubricant to be splashed into the upper portion of the chamber in the rear end of the case $a$. A pocket 90' is formed above each bearing 20 to catch the lubricant which is splashed into it and to conduct it through a hole 91 into the outer portion of one of the housing sleeves 15, 16, so that it will drip onto one of the driven shafts $c'$ so that some of the lubricant will be carried outwardly by the shaft to its bearing 21. This lubricant will also accumulate in the sleeves. A cross-wall 93 is formed in each housing sleeve adjacent the outer end of its bearing 20. The vibration and tilting of the tractor will cause some of the lubricant to be retained in the pocket 92 formed by the wall 93 to keep the bearing 20 for the differential drum and the bearing surfaces between the gears $c^2$ and the sides of the drum well lubricated.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In variable speed transmission gearing for tractors, the combination of a case, sleeves on the sides of the case, differential gearing comprising shafts extending through said sleeves, and bearings in the sleeves for the differential gearing, the case being provided with elevated pockets for catching lubricant splashed by the gearing and with means for conducting lubricant from the pockets into the inner ends of the sleeves.

2. In variable speed transmission gearing for tractors, the combination of a case, differential gearing comprising shafts in the case, bearings in the case for the differential gearing, and sleeves on the sides of the case for said differential shafts, the case being provided with elevated pockets integrally formed thereon for catching lubricant splashed by the differential gearing and with means for conducting lubricant from the pockets into the inner ends of the sleeves.

3. In variable speed transmission gearing for tractors, the combination of a case, differential gearing comprising shafts in the case, a drive-shaft in the case, variable speed gearing between said shaft and the differential gearing, and bearings in the case for the differential gearing, sleeves on the sides of the case for said differential shafts, the case being provided with elevated pockets for catching lubricant splashed by the differential gearing and with means for conducting lubricant from the pockets into the sleeves.

4. In variable speed transmission gearing for tractors, the combination of a case, differential gearing comprising shafts in the case, bearings in the case for the differential gearing, and sleeves on the sides of the case for said differential shafts, the case being provided with means for conducting lubricant from the case to the sleeves, the latter being provided with walls for holding lubricant in the bearings.

5. In variable speed transmission gearing for tractors, the combination of a case, differential gearing comprising shafts in the case, bearings in the case for the differential gearing, and sleeves on the sides of the case for said differential shafts, the case being provided with elevated pockets on the sleeves for catching lubricant splashed by the differential gearing, means for conducting lubricant from the pockets to the sleeves, the latter being provided with walls for holding lubricant in the bearings.

6. In variable speed transmission gearing for tractors, the combination of a case, differential gearing comprising shafts in the case, and sleeves on the sides of the case for said differential shafts, having bearings therein for the differential gearing, the sleeve having elevated pockets integrally formed on their inner faces for catching lubricant splashed by the differential gearing ducts therein for conducting lubricant from the pockets into the sleeves and integral walls for holding lubricant in the bearings.

JOHN B. FOOTE.
GEORGE T. STRITE.